July 31, 1962 A. D. COGGESHALL 3,047,756
GLASS-RESIN TAPE FOR ARMATURE BANDING
Filed Jan. 2, 1959
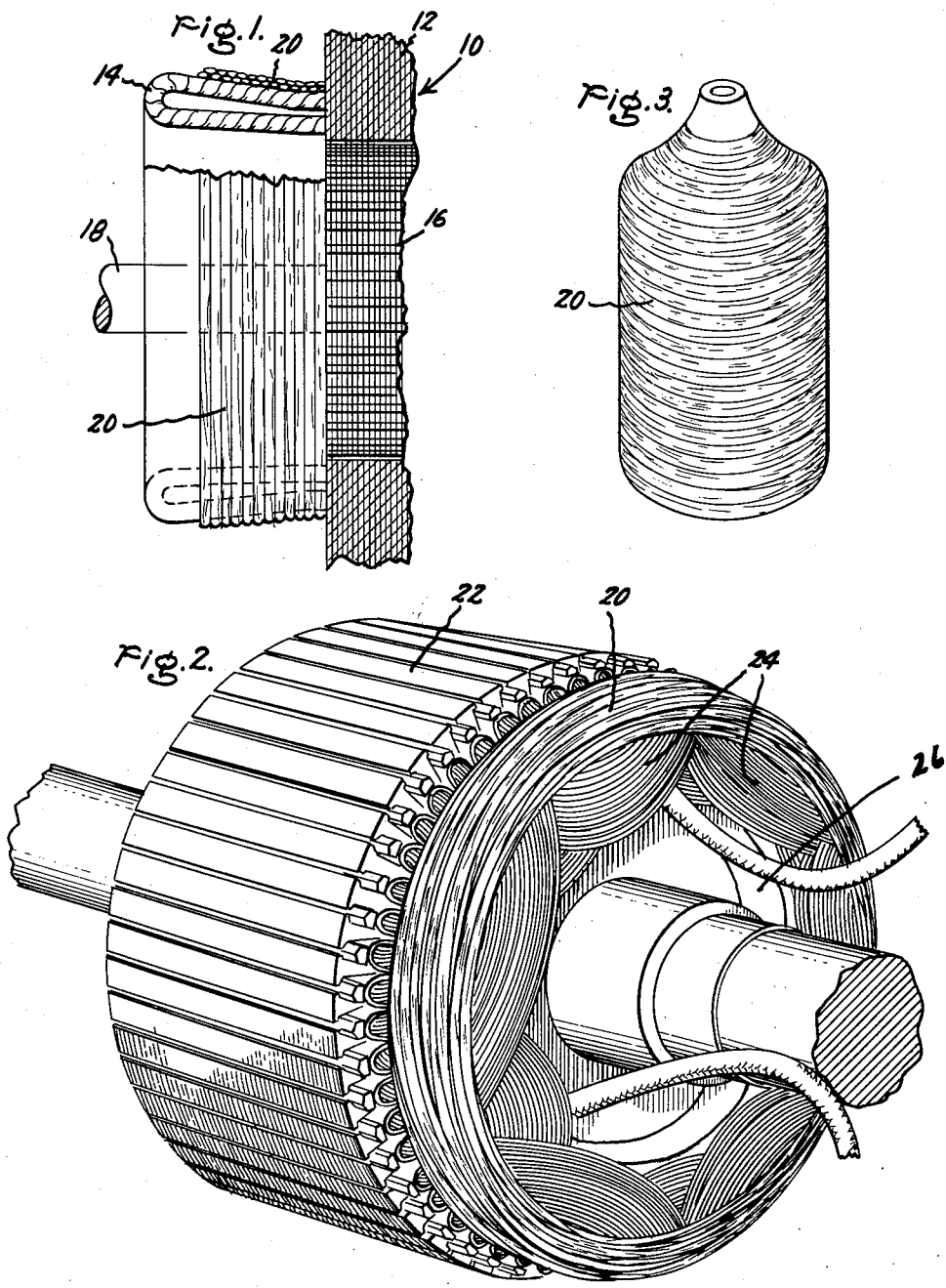
Inventor:
Almy D. Coggeshall,
by James R. Campbell
His Attorney.

United States Patent Office 3,047,756
Patented July 31, 1962

3,047,756
GLASS-RESIN TAPE FOR ARMATURE BANDING
Almy D. Coggeshall, Schenectady, N.Y., assignor to General Electric Company, a corporation of New York
Filed Jan. 2, 1959, Ser. No. 784,744
6 Claims. (Cl. 310—271)

The invention described herein relates to glass fiber banding and more particularly to resin impregnated glass ribbon or tape of high tensile strength used for restraining end turns of dynamoelectric machines against radial displacement.

The Coggeshall et al. Patent 2,747,118, assigned to the same assignee as the present invention, discloses glass roving comprising parallel glass strands impregnated with a thermosetting resinous composition which when cured, displays great strength and rigidity and important electrical characteristics making it especially adaptable for use in dynamoelectric machines. The roving or glass banding is applied circumferentially on the outer peripheral surfaces of rotor end turns to exert an inward radially directed compressive force which is greater and opposite to the outward forces produced by centrifugal action. If the inward compressive force is lost or decays, the end turns then can be thrown centrifugally outward to cause unbalance of the rotating member. Moreover, in the event gross displacement takes place, rupture of the coil insulation or of the coil conductors themselves may occur. The resin in the roving is in the form of a highly viscous solid when the roving is applied to either stator or rotor coil end turn surfaces. A final cure under the influence of heat imparts the desired strength properties to the material for preventing subsequent movement of the end turns when acted on by magnetic and/or centrifugal forces. Operation of dynamoelectric machines having such roving surrounding the end turns has proved successful.

The commercially available glass roving used for this purpose consists of a multiplicity of monofilaments, usually 204 monofilaments, of extremely small cross section loosely gathered to form an end. A plurality of such ends constitutes the roving. These monofilaments or fibers which initially are not treated with a resin, are free to move laterally with respect to each other, thus giving the roving the attribute of flexibility. If the roving is then placed in tension, there is little sharing of the load between fibers so that the structure fails fiber by fiber and the entire bundle is seen to rupture at a low value of elongation, approximately ¼ of 1%, with a corresponding tensile stress of about 20,000 p.s.i. However, when the roving is impregnated with a resin of the type disclosed in the Coggeshall et al. patent, to produce a limp, tack free flexible product, the resinous binder provides a certain amount of sharing between fibers so that both the strength and elongation is approximately doubled.

The resinous binder in this state is an uncured plastic solid and will slowly flow under the application of stress so that over a period of time, the tightest fiber assumes the major load, and failure, fiber by fiber, again becomes possible. Curing of the resin will negative this disadvantage however. The prior art teaches that it is desirable to have approximately 20 percent of resin by weight in the final composition in order to obtain bonding between successive layers and to develop a unitary structure during final cure which provides maximum mechanical strength. A concept also generally accepted was that if less than 20% of resin was used, the material was said to be "starved," dry, deficient in stiffness and mechanical properties.

It is evident that it would be highly desirable to combine these distinct characteristics of flexibility inherent in the untreated roving and improved tensile strength resulting from partially curing the resin treated roving. Such a construction would permit winding the roving over sheaves, tension devices, and other objects having sharp bends and where it is desired to maintain them under relatively high tensions or pressures.

The primary object of my invention therefore is to provide such an improved resin impregnated glass roving or banding tape incorporating the desirable features of high tensile strength and flexibility.

Another object of my invention is to provide resin impregnated glass banding material having a lesser amount of resin than that taught by the prior art for furnishing a high degree of elongation at a high stress level so that when the material is applied to coil end turns, the force resulting from such elongation, which remains permanent with time, resists the greatest outward force presented by end turns.

In carrying out my invention, I provide improved glass banding tape consisting of substantially parallel glass fibers, woven or otherwise formed, and impregnated with between 2% and 8% resin by weight. Upon complete curing of the resin, the tape displays exceptional tensile strength and flexibility heretofore considered incompatible in the same product. The degree of impregnation of the resin is such that the interior of the individual ends comprising the tape is well bonded while the bonding between ends is weak, thus imparting flexible characteristics to the tape and permitting it to be wound over tension devices having reverse bends and other objects of irregular or smooth configuration. Any load to which the tape may be subjected is shared equally between the parallel glass fibers thus greatly increasing the tensile strength of the composite of fibers and permitting the tape to be wound at stress levels in excess of 100,000 p.s.i. When the material is wound peripherally in the form of a ring on the end turns of a dynamoelectric machine, the ring displays a greater and more permanent degree of tensile elongation than prior rovings and the elastic elongation acts to produce a radial inward force on the windings of the machine which opposes the outward centrifugal forces and holds the end turns substantially immovable.

While the specification concludes with claims particularly pointing out and distinctly claiming the subject matter which I regard as my invention, it is believed the invention will be better understood from the following description taken in connection with the accompanying drawing in which:

FIGURE 1 is a view in elevation of a form wound rotor illustrating the application of the roving to the coil end turns;

FIGURE 2 shows a similar application of the roving to the end turns of a random wound motor; and FIGURE 3 illustrates the use of the roving when applied to a container designed for holding fluids under exceptionally high pressures.

As indicated in the introductory portions of the application, untreated roving comprising a multiplicity of glass monofilaments or fibers is not capable of withstanding great axial stresses imposed thereon because the load is not capable of being shared equally between adjacent fibers. As a result, a tearing type of failure is obtained wherein the fibers break individually and sequentially rather than having the whole mass of fibers fail simultaneously. When treated with the partially cured resinous composition referred to in the Coggeshall et al. patent, the mutual adhesion developed between fibers, while of a low order, makes possible a stronger material.

While conducting experiments with roving having a glass content from 68% to 95% glass, and the remainder hardened resin, I unexpectedly found that with very light resin applications followed by complete curing, it is possible to obtain very high tensile strengths and for the roving structure to separate or internally delaminate without affecting the main strength of the fibers, thus giving added flexibility.

Using these very low resin values, the internal structure of the roving or tape delaminates rather readily and thus the material becomes flexible without greatly damaging the fundamental fiber integrity. The use of low resin concentrations also increases percentage-wise, the volume of glass in the final structure which increases the strength on a cross sectional area basis.

This surprising observation constitutes a departure from the prior art which has observed very high strengths in unidirectional fiber structures, but it has taught that optimum strengths were found in the range of 70% to 80% by weight of glass, with the remainder resin, and that when the glass content exceeded 85% by weight, grossly inferior strengths were obtained.

The tape may comprise substantially parallel glass fibers or monofilaments assembled together to form a product of the type conventionally found in the textile industry. In the latter type of rovings or tapes or yarns, it is desirable to maintain the fibers in substantial parallel relationship with each other.

More specifically, it was discovered that by reducing the resin content in substantially parallel glass fibers, from ⅓ to ⅒ of that previously used, and by curing this resin to a hard strong solid that the elongation of the fiber will rise to approximately 2 percent with corresponding tensile stresses in the glass in the order of 200,000 p.s.i. The significance of this value may be better understood in the light of the knowledge that the strength for a single freshly drawn glass monofilament under ideal conditions is given as 450,000 p.s.i.

The prior art has taught that the resin impregnated in the glass fibrous material had to be cured partially to permit factory handling of the product. Final curing of the resin then was obtained after the material was applied to the product and heated. In the event the glass fibers were bonded together by fully curing the resin, stiff rod-like structures were obtained which were totally unsuitable for being wound on spools, accepting reverse bends in tensioning devices, and other uses to which such materials would be subjected. Because of its uniquely low resin content, the glass fibrous material described herein can be cured before application to a product, and while not limp, is of adequate flexibility for the intended application. When sharply bent, the material does not crack as would be expected, but rather, delaminates in a local area so that the ends comprising a multiplicity of glass fibers become separated over only a short distance. When placed in tension, these fibers align themselves to substantially the same orientation as before delamination, so that the tensile strength and elongation of the material are substantially unimpaired.

To illustrate more clearly the improvement in tensile strength and elongation obtained by the practice of the present invention, Table I shows these values for untreated glass specimens, for glass fibers impregnated with approximately 20% resin, and as according to the present invention.

Table I

|  | Ultimate stress, p.s.i. based on total cross section | Ultimate elongation, percent |
| --- | --- | --- |
| (1) Bundles of untreated glass fibers | 20,000 | .19 |
| (2) Bundles of glass fibers treated with approximately 20% resin | 85,000 | 1.2 |
| (3) Bundles of glass fibers treated in accordance with the present invention, 7% resin content, and cured | 195,000 | 2.2 |

The bundles of glass fibers used in (1) consisted of a multiplicity of monofilaments joined together to form ends of the type previously described. Those fibers impregnated with approximately 20% resin as in (2), were partially cured in the manner disclosed in the Coggeshall et al. patent to provide a semi-solid, tack-free resin. The resin in the glass fiber bundles in (3) was fully cured prior to the test. The improvement in ultimate stress and elongation characteristics, as indicated in (3), over prior rovings is impressive. It is especially significant in light of present extensive use of resin treated glass fiber tapes in banding armature end turns. Constant effort is being made by tape manufacturers and others to provide a product to the electrical industry which would exhibit these desirable characteristics and be capable of fulfilling the other necessary requirements when installed on dynamoelectric machines. The use of lesser amounts of resin in the banding tapes disclosed herein, is not merely a matter of degree as one initially would expect because this previously unknown product will satisfy the need for a banding tape that inherently will contain all the tensile strength necessary for compressing the end turns inwardly of even the largest dynamoelectric machines.

The effect of the present invention in retaining prestress in the glass banding tape is illustrated in Table II. In these experiments, a drum was mounted in a winding lathe, and instrumentation was provided to measure the inward radial force produced by tension in the applied fiber. This testing structure measures the inward components of force accurately. A number of duplicate specimens also were wound with various materials and subjected to heat in the same manner as that encountered by a rotor for a dynamoelectric machine during the manufacturing operation.

Table II

|  | Stress in Fiber during winding | Stress in fiber after heating 24 hrs. at 150° C. and cooling to room temperature |
| --- | --- | --- |
| (1) Bundles of glass fibers impregnated with a liquid resin at the time of winding | 20,000 | 2,000 |
| (2) Bundles of glass fibers treated with approximately 20% resin | 50,000 | 16,000 |
| (3) Bundles of glass fibers having a 20% resin content but heated at the time of winding to soften resin so that majority of the resin flow would be produced by the action of the tension device | 50,000 | 37,500 |
| (4) Bundles of glass fiber treated in accordance with the present invention, lightly coated with the same resin as in (1) at the time of winding | 102,000 | 98,000 |

From the above table it is seen that glass banding tape prepared in accordance with the present invention may be applied with a stress approximately twice that of the prior art, and that the usefully retained stress is almost three times that previously attainable.

One requirement for a material used for binding the end turns of dynamoelectric machines is that it may be stretched or elongated to the maximum possible extent and be capable of being bound peripherally around the machine end turns in the stretched or elongated state. This stretch or elongation shall be elastically recoverable while providing the inward radial forces mentioned above. It is obvious that if the stretching or elongation is in any way diminished, the radial inward force will likewise diminish with the undesirable consequences to the machine previously discussed. The methods of manufacturing electrical machinery impose conditions where a certain amount of this elongation will be consumed in properly seating coils, compressing high spots and in a certain amount of plastic deformation common to almost all insulating materials. Fortunately, all of the above are reasonably constant. If the elongation imposed in the banding is small, almost all of it will be used up in seating coils, plastic flow, etc. and very little will be left to produce this inward radial force that is essential to successful operation.

The requirements for the resin used in impregnating the substantially parallel glass fibers is that it should be capable of bonding to the glass fibers, and where a second resin is used for sealing the free end of the tape, both resins should be compatible with each other for obtaining the desired unitary bonded structure. It should be capable of permitting internal delamination after the resin is fully cured. Primarily, the resin should be resistant to the temperatures and environments encountered by dynamoelectric machines, such as, atmospheres containing oil, moisture, fumes from chemical plants, carbon black and the like.

A number of commercially available resins heretofore used in impregnating glass fibers were used successfully in the developmental work connected with this invention. Specifically, Laminac 4119 marketed by the American Cyanamid Co., BRS-5142 by the Bakelite Corp., #73517 Resin and #3405 Permafil resin by the General Electric Company, all are satisfactory for use in the banding tape. All of the above are modifications of a generic type of resinous material known as unsaturated polyester resins which are dissolved in the reactive diluent such as styrene or diallyl phthalate and are caused to solidify through the action of a peroxide catalyst.

It will be obvious to those skilled in the reinforced plastics art that many other resinous materials which are used successfully in connection with glass fibers will be similarly applicable in the practice of the present invention. Examples of the foregoing are resins of the epoxy or ethoxylene types, resins of the phenolic type, resins of the polycarbonate type and modifications or combinations of the above. In view of the above, it will be evident that any resin may be used with the tape so long as it meets the requirements stated herein. Obviously, this improved tape is not limited to use with dynamoelectric machines since it is susceptible to general applicatons and has a wide variety of uses. The foregoing examples are given by way of illustration and not by way of limitation.

Applications of the use of this banding tape for commercial and industrial uses are manifold. For example, the end turns of dynamoelectric machines such as the form wound bars shown in FIGURE 1 or on the random wound coils of FIGURE 2 can be drawn inwardly to a greater degree and a corresponding greater amount of mechanical energy imposed therein. Since the levels of stress are almost doubled over that previously obtainable, the inner flanges and other devices used for supporting the end turns can be eliminated in some instances. An advantage of primary importance is that with the application of greater stresses, a lesser amount of tape is needed for binding the end turns which in turn involves a smaller percentage of time needed in binding the end turns in position. Therefore, not only does the tape display greater tensile strength, elongation and increased flexibility characteristics, but it also permits the manufacture of products at lesser cost by virtue of the smaller amount of tape needed to perform the same function as that heretofore used.

Referring more specifically to FIGURE 1, there is shown a stator 10 comprising a plurality of laminations 12 having coils including end turns 14 positioned in slots in the stator in the usual manner. A rotor 16 mounted on a shaft 18 is centrally positioned in the stator for rotation therein. Resin impregnated glass banding tape 20 comprising a plurality of substantially parallel glass fibers impregnated with between 2% and 8% resin of the type described above, is wound in the form of a shroud on the outer peripheral portions of the end turns 14. The resin in the roving 20 is completely cured thereby permitting the roving to be applied to the end turns with a force corresponding with the tensile stress of 100,000 p.s.i. in the roving. After the roving is wound on the end turns, the loose end may be secured to the layers of roving therebeneath by merely applying a thermosetting resin over the loose end as more fully described hereinafter. When subjected to heat, this additional resin cures to a hard mass which firmly bonds the loose end to the adjacent areas of the roving.

As indicated in FIGURE 2, the banding tape 20 likewise can be applied as a shroud to random wound rotors of the type comprising a rotor 22 having coils 24 disposed in the rotor slots. A flange 26 may be used beneath the end turns. Also, it will be evident that this banding tape can be applied to coils of other electrical apparatus in which the coil end turns move as a result of magnetic and/or centrifugal forces. An example of this is the coils positioned in the stators for dynamoelectric machines.

Since the resin in the tape is completely cured before the tape is applied to the end turns, it is evident that means must be provided for securing the loose ends to form a unitary bonded structure. This may be accomplished by adding a small amount of uncured resin in the form of an overcoat to the tape at the time of manufacture, by applying it directly to the fiber at the time of winding, or only to the loose ends of the tape. Preferably, it should provide a high degree of bonding to the glass fiber structure. Obviously, other means may be used, such as employing metal tying clips to the free tape ends, or cinching them to the layers wound therebeneath.

Another use for the tape involves its application to the external surfaces of containers adapted for containing relatively high pressures. As shown in FIGURE 3, a cylinder of the type normally used for containing gas or liquids under high pressure is often not capable of withstanding such pressures unless the walls thereof are of heavy material. Since the banding tape can be applied thereto under tension, a predetermined amount of mechanical energy can be incorporated in the structure by the tape for augmenting the strength normally contained in the walls of the container and effectively serves the function of restraining the container against outward pressures.

In view of the above, it will be evident that many modifications and variations are possible in light of the above teachings. It therefore is to be understood that within the scope of the appended claims, the invention may be practiced otherwise than as specifically described.

What I claim as new and desire to secure by Letters Patent of the United States is:

1. A magnetic core for a dynamoelectric machine comprising a plurality of laminations having coils therein, coil end turns projecting outwardly from the core, and a plurality of substantially parallel glass filaments impregnated with between 2% and 10% by weight of a resinous composition on said end turns for preventing displacement thereof when subjected to magnetic and/or centrifugal forces.

2. Glass tape for restraining end turn displacement in a dynamoelectric machine comprising a multiplicity of substantially parallel glass fibers impregnated with a fully cured thermosetting resinous composition in an amount constituting between 2% and 10% of the total weight of the tape, said tape displaying properties of tensile strength in excess of 100,000 p.s.i. and of sufficient flexibility to withstand reverse bends without structurally failing.

3. A magnetic core for a dynamoelectric machine comprising a plurality of laminations having coils therein, coil end turns projecting outwardly from the core, substantially parallel glass fibers impregnated with a resinous composition cured to its optimum level and wound on the peripheral portions of the end turns, said impregnated glass fibers displaying properties of mutual adhesion provided by the cured resin and thereby permitting the individual fibers to share the imposed load equally.

4. A magnetic core for a dynamoelectric machine comprising a plurality of laminations having coils therein, coil end turns projecting outwardly from the core, substantially parallel glass fibers impregnated with a resinous composition cured to its optimum level and wound on the peripheral portions of the end turns such that during the winding process, the impregnated glass fibers are elongated .75% or greater to impart an inward compressive force substantially greater than any outward forces expected to be exerted by the end turns.

5. The combination according to claim 4 wherein during the banding operation, the glass fibers are elongated greater than 1%.

6. A magnetic core for a dynamoelectric machine comprising a plurality of laminations having coils therein, coil end turns projecting outwardly from the core, and a tape comprising a plurality of substantially parallel glass fibers impregnated with a thermosetting resinous composition fully cured under the influence of heat, said tape displaying properties of tensile strength in excess of 100,000 p.s.i. and of sufficient flexibility to withstand reverse bends without structurally failing, and means on said tape for bonding the free end thereof to the layers therebeneath, said means on the tape comprises a partially cured thermosetting resinous composition in an amount just sufficient to bond the turns thereof to each other when subjected to heat.

References Cited in the file of this patent
UNITED STATES PATENTS 2,747,118     Coggeshall et al. _____ May 22, 1956
2,749,460     Acton et al. _____ June 5, 1956

OTHER REFERENCES

Railway Locomotives and Cars, December 1957, "Glass Tape for Armature Banding," pp. 38, 39.